United States Patent [19]

Fiedler

[11] Patent Number: 4,637,101
[45] Date of Patent: Jan. 20, 1987

[54] ACTUATOR WITH OSMOTIC PRESSURE ACTUATION

[76] Inventor: Leslie C. Fiedler, 420 W. Coolidge Dr., San Gabriel, Calif. 91775

[21] Appl. No.: 455,650

[22] Filed: Jan. 5, 1983

[51] Int. Cl.⁴ ............................................. B64D 17/32
[52] U.S. Cl. ..................................... 24/602; 24/603; 244/122 R; 210/637
[58] Field of Search ................ 24/602, 603, 115 L, 24/136 A, 323, 616; 244/122 R; 210/637; 60/326

[56] References Cited

U.S. PATENT DOCUMENTS

| | | | |
|---|---|---|---|
| 2,763,451 | 9/1956 | Moran | 24/603 |
| 3,262,173 | 7/1966 | Pickens | 24/603 |
| 3,314,088 | 4/1967 | Nordhaus et al. | 24/602 |
| 3,427,978 | 2/1969 | Hanneman et al. | 210/637 |
| 3,437,370 | 4/1969 | Bochman, Jr. et al. | 24/603 |
| 3,460,209 | 8/1969 | Modrey | 24/603 |
| 3,587,227 | 6/1971 | Weingarten | 60/326 |
| 3,609,825 | 10/1971 | Pullos | 24/602 |
| 3,766,611 | 10/1973 | Gaylord | 24/603 |
| 3,967,797 | 7/1976 | Drew | 24/603 |
| 4,014,080 | 3/1977 | Caradec | 24/602 |
| 4,095,313 | 6/1978 | Piljay | 24/603 |

FOREIGN PATENT DOCUMENTS 0032773 7/1981 European Pat. Off. ............ 24/602

*Primary Examiner*—Victor N. Sakran
*Attorney, Agent, or Firm*—Donald D. Mon

[57] ABSTRACT

An actuator/sensor responsive to concentration of a substance in a liquid comprising a case containing in a rigid chamber a liquid of lesser concentration of that substance, and an exit opening at least in part occluded by a membrane possessing osmotic properties, whereby when a sufficiently concentrated solution contacts the membrane outside the chamber, liquid in the chamber leaves in an attempt to dilute the more concentrated solution, creating a lesser pressure which can be utilized as a signal or actuating power. Actuating means such as a retention pin can be moved from a ready to an actuated position as a function of the lowering of pressure in the compartment.

5 Claims, 6 Drawing Figures

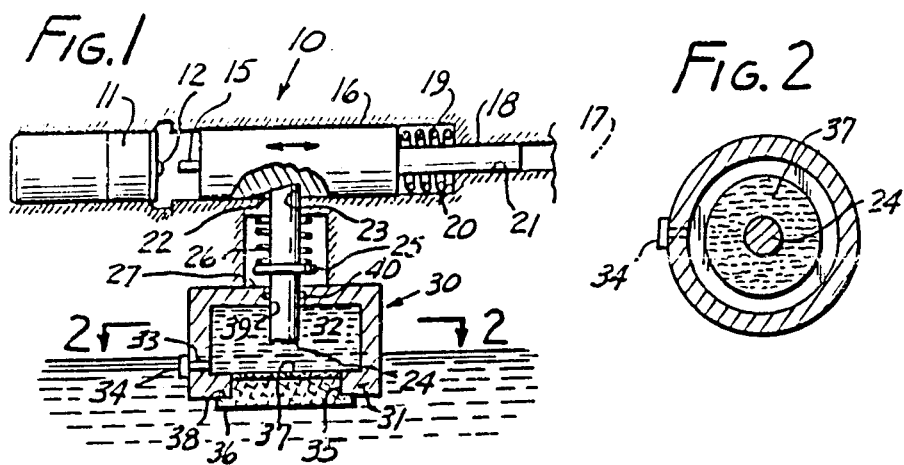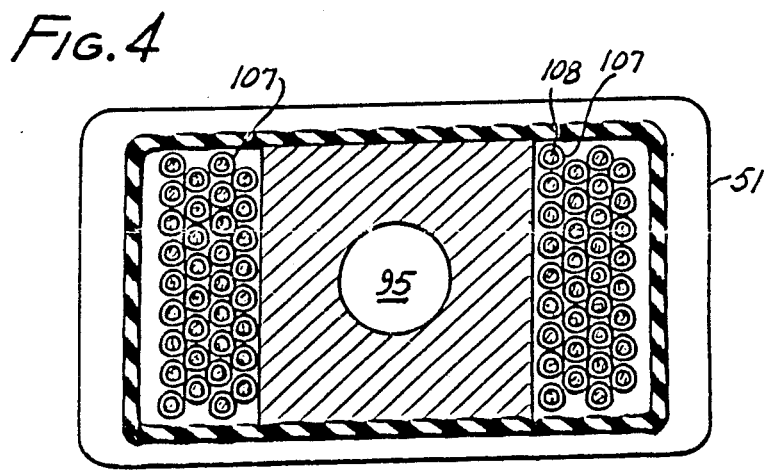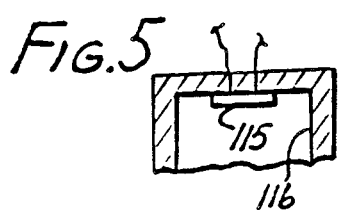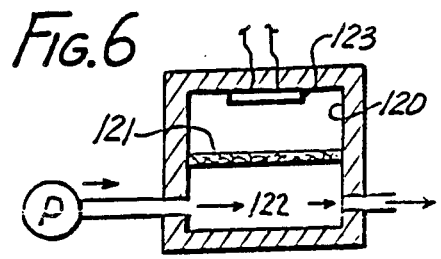

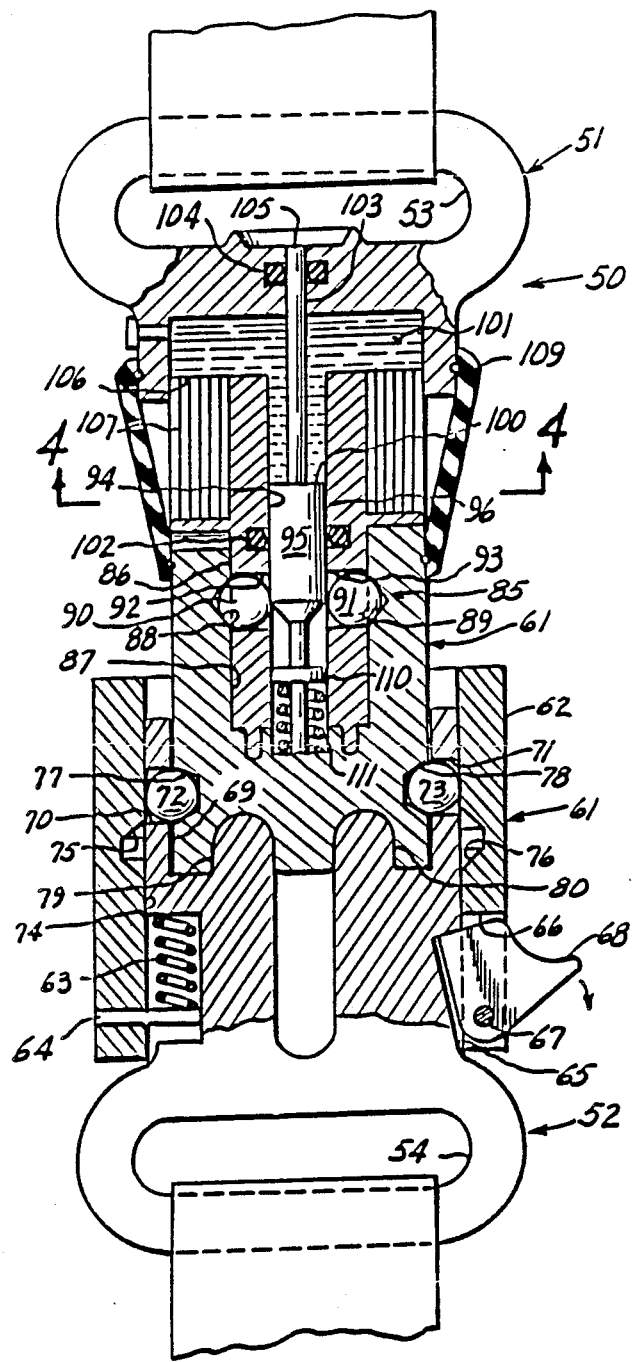

ACTUATOR WITH OSMOTIC PRESSURE ACTUATION

FIELD OF THE INVENTION

This invention relates to sensors which utilize osmotic phenomena, and to devices responsive to the effect which they produce.

BACKGROUND OF THE INVENTION

There exists a number of requirements for a means to respond quickly to the presence of certain classes of liquids, for example salt water. For example, it is necessary to separate an aviator from his parachute canopy very quickly as soon as he is immersed in salt water, but also there exists the need for insensitivity to pure water or to saline solutions of lesser concentration than that of ocean water in order that the canopy will not be released when falling through a rain storm or approaching the surface or turbulent water where the spray would be diluted saline, because then the aviator would be separated from his chute while still in the air.

Numerous sensors, generally electronic or current-conduction types, have been suggested for this application, but often they are too sensitive or too insensitive, too complicated, employ excessive force for the separation, or involve a combination of two or more of these problems.

Other useful examples are such as sensing external concentrations, relative to a standard concentration.

It is an object of this invention to provide a sensor which is responsive to external solute concentrations by providing an osmotic effect, which can quickly and reliably provide a signal, and if desired, also an actuating means in response to the external presence of some species, such as an ionic species.

Also, it is an object of this invention to provide such a sensor which is passive, and whose response is in no way dangerous to a person carrying it.

BRIEF DESCRIPTION OF THE INVENTION

A sensor/actuator according to this invention includes a rigid chamber having an exit occluded by a permeable membrane possessing osmotic properties. A liquid is contained in the chamber which has either none of the species to be responded to, or which has it in a lesser concentration than is to be responded to, in order that when the membrane is contacted by a sufficiently concentrated solution of, for example, ocean water, some of the liquid content of the chamber will permeate through the membrane for the purpose of diluting the solution being sensed in accordance with normal osmotic considerations. This at least partially evacuates the chamber, and reduces the pressure therein. This lesser pressure can be utilized either as a signal, or as a physical means for actuating a piston or other pressure-sensitive device which may act directly, or act as a pilot mechanism, to actuate some device, for example to enable a separable buckle to release a parachute canopy.

According to a preferred but optional feature of the invention, the membrane is provided on a surface of a plurality of hollow permeable tubes which are exposed externally so as to be contacted by a solution being sensed, and to be internally supplied with the liquid inside the chamber.

The above and other features of this invention will be fully understood from the following detailed description and the accompanying drawings, in which:

BRIEF DESCRIPTION OF THE DRAWINGS

FIG. 1 is a side view, partly in cut-away cross section and partly in schematic notation, showing a system utilizing the invention;

FIG. 2 is a cross-section taken at line 2—2 in FIG. 1;

FIG. 3 is an axial section of the presently preferred embodiment;

FIG. 4 is a cross-section taken at line 4—4 in FIG. 3; and

FIGS. 5 and 6 are fragmentary sections of other embodiments of the invention.

DETAILED DESCRIPTION OF THE INVENTION

FIG. 1 shows a device 10 to be actuated as a consequence of sensing a specific condition. In this case, a fragment of a cartridge 11 is shown which, when its firing point 12 is struck, will discharge to release a volume of gases under pressure for actuation purposes. The purposes of the construction yet to be described is to cause this action to occur at the proper time.

A firing pin 15 is provided on a spindle 16 which is axially movable along axis 17. It is supported by a bearing (not shown). It includes a guide stem 18, and a bias spring 19 surrounding it and bearing against supporting structure 20 so as to bias the firing pin toward the left in FIG. 1. A guide passage 21 is formed in structure 20.

A detent groove 22 is formed in the outside surface so that the spindle has a detent shoulder 23 against which a retention pin 24 can bear when inserted into the groove. The retention pin is in the form of a shaft having a collar 25 surrounded by a bias spring 26 which also bears against structure 27. The bias spring tends to bias the retention pin out of the detention groove. This will assist the removal of the retention pin when the actuator causes it. The retention pin is held in place by the fullness of chamber which is yet to be described.

The illustrated position is the loaded or cocked position. The device will be fired when the retention pin is pulled downwardly in FIG. 1. For this purpose, the sensor/actuator 30 of the invention is provided. The sensor includes a rigid case 31 having a rigid internal chamber 32. The volume of the chamber is constant within the range of pressures used herein. A fill port 33 passes through the case wall, and a removable plug 34 is fitted in it to retain liquid in the compartment. It might instead be a penetrable plug, receptive of a needle.

The case has one or more exit ports 35. In the illustration embodiment there is shown only one. A closure 36, at least a portion of which is bounded by an osmotic membrane 37, closes the exit port. The membrane may conveniently be laid upon a porous substrate such as a porous ceramic filter, for example, and the closure may have a shoulder 38 to limit the entry of the closure into the exit port. It may be cemented to the case, if desired. Thus, the membrane occludes the exit port, and liquid which flows through the port must flow through the membrane.

The case also has a guide sleeve 39 with a peripheral seal 40 which enables the retention pin to slide axially. An end of the retention pin is exposed in the chamber. It will be seen that there is a differential pressure on the cross-section of the retention pin exposed in the chamber between whatever pressure is inside the chamber and to atmospheric plus spring pressure outside the chamber.

It will be evident from an examination of FIGS. 1 and 2, that should the liquid in the chamber be withdrawn, the reduction of volume of liquid leaves a void, and pressure within the chamber will abruptly be reduced. The differential pressure on the retention pin will then cause it to be drawn downward into the chamber, assisted by the bias of the spring. This will remove the detent shoulder from the detent groove and enable the firing pin to be propelled by its spring toward firing point 12. It is evident that the means for actuating the system of FIG. 1 is to cause the liquid in chamber 32 to leave it, whereby to reduce the pressure therein to an actuating level. The theory behind this departure of liquid will later be described.

FIGS. 3 and 4 show the presently preferred embodiment of the invention, which is also its best known mode. The function of this device is to enable a parachute buckle 50 to be separated upon immersion in salt water, and also to be routinely attachable and detachable under normal operating conditions. Such a buckle has a pair of buckle halves parts 51, 52 which are separable from one another. Each has an aperture 53, 54 to receive a strap. Either half could be attached to the wearer's harness and the other to the parachute assembly.

Generally speaking, it will be found better practice to attach half 51 to the parachute and half 52 to the harness, because then the sensor can be checked out along with the parachute, and will generally be kept in safer storage conditions.

The halves are connected by a duty coupling 60 with a bridge portion 61 between them. The bridge portion is connected to the halves when two locking means yet will be described. The duty coupling includes a coupler sleeve 62 which is biased downwardly in FIG. 3 by a bias spring 63 which presses against a pin 64. The coupler sleeve is generally rectangular or circular and surrounds the bridge portion. The coupler sleeve has a slot 66 in one side, in which there is pivotally mounted by means of pin 67, a dog 68 which is pivotable around the pin and movable inwardly to the position shown in FIG. 3 into a notch 65 in half 52 to hold the coupler sleeve in the position shown in FIG. 3. It can be pivoted out to release the coupler sleeve for axial movement.

Half 52 includes a receptacle 69 to receive the bridge member 61, and in its wall has a pair of ball retainers 70, 71 each holding a respective ball 72, 73. The coupler sleeve has an inside wall 74 with a pair of release grooves 75, 76 to receive the ball under certain circumstances. The bridge member has a pair of single circular of lock groove 77, 78 to receive the balls under other conditions yet to be descirbed. A pair of alignment pins 79, 80 are provided on half 52, and matching recesses are provided in the bridge member to keep the device in alignment. As it happens, the lateral spacing between wall 74 and the base of the lock grooves in the bridge member is approximately equal to the diameter of the balls. The dimension between the outside wall of the bridge member and the base of the release grooves in the coupler sleeve is about equal to the diameter of the respective ball. These relationships provide a ball detent mechanism adapted to lock the bridge member to half 52 in the condition illustrated in FIG. 3, and to release it when the coupler sleeve is moved upwardly. The dog will be removed from the recess in the bridge member to permit the coupler sleeve to move upwardly. The balls can then move into grooves 75 and 76. This is the duty coupling, which will be utilized each time the wearer connects his harness to the parachute, and disconnects it.

It is the function of this invention to separate half 51 form half 52 when a membrane is exposed to solutions of sufficient concentration of a selected ionic species, such as sodium chloride. This is done by separating half 51 from bridge member 61.

A second ball detent mechanism 85 is utilized to make this connection. In this mechanism, half 51 has a neck 86 which fits inot a receptacle 87 in bridge member 61. Bridge memer 61 includes a pair or singular of lock groove 88, 89 to recieve balls 90, 91, respectively, which are held in retainer ports 92, 93 in neck 86.

A passage 94 extends centrally through the neck and receives a plunger 95 which performs a locking function at its outer wall 96 when in the lowermost position as shown in FIG. 3. Under these circumstances the spacing between the bottom of the lock grooves and the outer wall is equal to the diameter of the respective balls. When the plunger is moved upwardly out of contact with the balls, the balls can move inwardly and unlock the device. It will therefore be seen that the operative function of this device is to lift the plunger in FIG. 3 so as to release the bridge member from half 52 when necessary.

The plunger includes an inside surface 100 exposed to fluid pressure in a chamber 101 defined by a rigid wall. This chamber is totally filled with a reference solution. A peripheral seal 102 seals around the plunger and prevents leakage from the chamber. An indicator stem 103 passes through a passage in the wall of half 51 and has a seal 104 to seal against leakage. In the locked position, the upper end 105 of the indicator stem is not visible. When there has been loss of volume of liquid in the chamber, the plunger will be drawn upwardly, moving the indicator stem so it will become visible and tell that the device requires servicing or has been actuated.

A plurality of ports 106 are formed in the wall of the chamber and in each of them are a hollow tubes 107. These tubes on an appropriate one of their surfaces, usually the inside surface, a layer of material comprising a semi-permeable membrane 108. The material of the tubes is, of course, permeable to liquid. Thus, the tubes which are closed at their lower end, and which at their upper ends admit liquid from the inside of the chamber form a continuation of the chamber and occlude the ports so as to form a part of the closure. The outside fo their surfaces presents a large area exposure of membrane to the surroundings. A peripheral peelable hermetic seal 109 protects this array from dust and moisture. Means (not shown) may be provided to peel it off when needed, such as by connecting it to the parachute canopy or to its shrouds.

Persons knowledgeable in the joinder art will recognize the conventional ball detent lock and release mechanisms used and further discussion of them is not believed to be necessary.

A collar 110 and a light bias spring 111 bias the plunger toward the release position which is, of course, opposed by the liquid in the chamber.

It will be evident that further devices can be utilized to separate the parts, such as preloaded springs or other separative mechanisms, even cartridges as shown in FIG. 1 can be provided to assure the positive separation as a consequence as movement of an unlocking movement.

In order to provide for movement of the actuating portions, an actuator/sensor is provided in one or the other parts as shown, which includes the said rigid case in the chamber to receive an appropriate liquid such as deionized water or some suitably dilute solution of the species being detected. When the conditions are such as to cause actuation, the flow of liquid will be from the chamber through the wall of the tube or tubes, and through the osmotic membranes. The osmotic membranes occludes the path through the exit port because all liquid must flow through the port. In all embodiments, exit of liquid from the chamber will result in an abrupt reduction in pressure in response to the presence of an external substance being sensed when it is in a suitable concentration. Actuation will be attained when enough liquid leaves the chamber sufficiently to lower the pressure that a response will occur such as pulling a pin or initiating some other event.

The actuator/sensor of this invention derives its function from the tendency of a liquid to flow through an osmotic membrane from the side of the membrane having a lesser concentration of the substance, usually an ionic or molecular species, to the side of the membrane having the greater concentration. The tendency is to dilute the greater concentration, and a considerable osmotic pressure is generated for this purpose. Thus, if the device is to be sensitive to ocean water, the chamber may be filled with de-ionized water or with salt water of lesser concentration than sea water. When sea water contacts the membrane, the effect will be for water in the chamber to permeate through the membrane to dilute the sea water outside and thereby at least partially to evacuate the chamber. In some situations it is undesirable for the device to be too sensitive. For example, when sea water is being sensed, it is undesirable for there to be a flow across the membrane if the membrane is only exposed to rain or to midly saline solutions such as might be found in ocean fogs or sprays. Instead, it is necessary that it respond only to concentrations that are only respective to the actual circumstances where separation or actuation should occur. Therefore, a midly concentrated saline solution can be in the chamber, in a concentration less than that of ocean water, and there will be no response except to more concentrated solutions (such as sea water). The saline content of the sea is well known, and the other concentration can readily be prepared.

The liquid need not be water. In some applications, it could be a glycol, or any other liquid which tends to flow across an osmotic membrane.

Various membranes are useful in this device, and of course the utility of this invention is not limited to detection of salt water. Instead it is useful for actuation whenever there is to be a differential concentration of solution across an osmotic membrane. A generally suitable class of membranes is composite polyamide membranes, deposited upon a microporous polysulfone or ceramic support. The support material in FIG. 3, for example, could have a wall thickness of approximately 0.002 inches with pores between about 20 angstroms and about 200 angstroms. Tubes having an outside diameter of approximately 0.020 inches are quite suitable, and there may be many of them, perhaps with their ends potted into a closure for an opening in the chamber wall.

It is not necessary that the actuation be a direct mechanical actuation. Instead, it can constitute a pressure-sensitive switch, or as shown in FIGS. 5 and 6, a piezo electric transducer 115 which generates a signal proportional to the pressure in a chamber 116. The leads from the transducer can be connected to any suitable piloting or direct operating device, and can be used for measurement as well as for actuation.

FIG. 6 further shows that a rigid chamber 120 can be provided with a rigid membrane 121 exposed to a flowing stream 122. Bidirectional flow can occur across this membrane, whenever the differtial concentration reverses. Thus, a standard solution, or rather a known amount of the solute relative to the known volume, will provide a "reference" or "standard". It should be kept in mind that the solute does not cross the membrane. Thus, departure of liquid will lower the pressure in the chamber, and the return of liquid will raise it. A pressure transducer 122 can provide a reading of the condition, and actuate or pilot corrective mechanisms, if desired.

Thus, there is shown an actuator/sensor which can be made responsive to concentrations of substances in liquids relative to some standard provided on the opposite side of the membrane for the purpose of actuation of a wide range of mechanical and electronic devices.

It will also be recognized that instead of providing a movable shaft or retention pin, the reduction of pressure within the compartment might be utilized insead to actuate other response means in response to the lowered pressure. Examples are electrical or electronic pressure switches, and other types of latching or sensing mechanisms.

This invention is not to be limited by the embodiments shown in the drawings and described in the description which are given by way of example, and not of limitation, but only in accordance with the scope of the appended claims.

I claim:

1. In combination: a sensor for detecting and responding to the presence of a suitably concentrated liquid solution with a pre-selected concentration of a solute comprising:
   a rigid case having an internal wall forming a rigid internal chamber to contain liquid of lesser or no concentration of said solute and through the said wall an exit port entering said chamber:
   a closure incorporating a membrane possessing osmotic properties closing said exit port, said membrane occluding at least part of said exit port, whereby liquid leaving said chamber must pass through the membrane; and actuator means responsive to a lowered pressure caused by exit of liquid from the chamber because said membrane contacts a liquid of at least said pre-selected concentration of solute to result in osmotic flow tending to dilute the last named liquid, said actuator means comrpising:
   an axially movable plunger slidingly fitted in an aperture in the wall of the case, entering in and exposed to pressure in said chamber, and exposed externally to a different pressure: and
   a separation mechanism responsive to the position of said plunger.

2. A combination according to claim 1 in which said membrane is a flat membrane laid upon a flat support, said support being in the form of a plug.

3. A combination according to claim 1 in which a tube projects from said exit port as a continutation thereof, the lumen of said tube in fluid communication with said chamber, said membrane being laid on one surface of said tube, and in which the outside of inside surface of said tube is exposed to the liquid whose properties are being sensed.

4. A combination according to claim 1 in which said separation mechanism includes ball-detent means.

5. A combination according to claim 1 in which a second separation mechanism is connected to said first mechanism whereby to provide separation capacity independent of said sensor.

* * * * *